(12) United States Patent
Kanai

(10) Patent No.: US 10,708,463 B2
(45) Date of Patent: Jul. 7, 2020

(54) PRINT APPARATUS, INFORMATION PROCESSING METHOD, AND STORAGE MEDIUM TO DETERMINE COORDINATE INFORMATION OF PLURAL POSITIONS TO PERFORM POST-PROCESSING ON A PRINTED SHEET

(71) Applicant: CANON KABUSHIKI KAISHA, Tokyo (JP)

(72) Inventor: Yasunori Kanai, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/704,952

(22) Filed: Sep. 14, 2017

(65) Prior Publication Data
US 2018/0084141 A1 Mar. 22, 2018

(30) Foreign Application Priority Data
Sep. 16, 2016 (JP) ................. 2016-181869

(51) Int. Cl.
| | | |
|---|---|---|
| H04N 1/00 | (2006.01) | |
| H04N 1/32 | (2006.01) | |
| G06F 3/12 | (2006.01) | |
| G03G 15/00 | (2006.01) | |

(52) U.S. Cl.
CPC ....... *H04N 1/32539* (2013.01); *G06F 3/1205* (2013.01); *G06F 3/1232* (2013.01); *G06F 3/1292* (2013.01); *H04N 1/00307* (2013.01); *H04N 1/00639* (2013.01); *G03G 15/6541* (2013.01); *H04N 1/00567* (2013.01); *H04N 2201/0094* (2013.01); *H04N 2201/3222* (2013.01)

(58) Field of Classification Search
CPC .... G06F 3/1254; G06F 3/1255; G06F 3/1264; H04N 1/00456; H04N 1/00466; H04N 1/00639; H04N 1/0044
See application file for complete search history.

(56) References Cited

U.S. PATENT DOCUMENTS

| | | | |
|---|---|---|---|
| 2003/0063313 A1* | 4/2003 | Ito ................. | G06F 3/1253 358/1.15 |
| 2009/0103114 A1* | 4/2009 | Nishimura ........... | H04N 1/0035 358/1.5 |
| 2009/0122326 A1* | 5/2009 | Chiba ................ | H04N 1/00392 358/1.9 |
| 2009/0190167 A1* | 7/2009 | Kanai ................ | G03G 15/6541 358/1.15 |

(Continued)

FOREIGN PATENT DOCUMENTS

JP 2009259292 A 11/2009

OTHER PUBLICATIONS

Hewlett Packard IPP Finishing 2.0 published on Aug. 22, 2014.*

*Primary Examiner* — Benny Q Tieu
*Assistant Examiner* — Haris Sabah
(74) *Attorney, Agent, or Firm* — Canon U.S.A., Inc. I.P. Division

(57) ABSTRACT

A print apparatus that controls a printing device and executes printing based on print data, transmits, to an external device, ability information including information indicating that post-processing by coordinate designation is unexecutable, upon condition that a transmission request for the ability information about the print apparatus is received from the external device.

9 Claims, 18 Drawing Sheets

(56) References Cited

U.S. PATENT DOCUMENTS

2014/0078549 A1\* 3/2014 Amiya ............... H04N 1/00233
358/1.15
2016/0060069 A1\* 3/2016 Miyahara ........... G03G 15/6541
358/3.28

\* cited by examiner

| NUMBER OF BINDING LOCATIONS | BINDING POSITION |
|---|---|
| ONE-LOCATION BINDING | TOP LEFT, BOTTOM LEFT, TOP RIGHT, BOTTOM RIGHT |
| TWO-LOCATION BINDING | LEFT, TOP, RIGHT, BOTTOM |

(OUTPUT EXAMPLE)
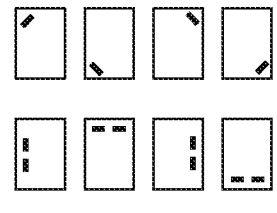

402

| NUMBER OF PUNCH HOLES | PUNCH HOLE POSITION |
|---|---|
| 2-HOLE PUNCHING | LEFT, TOP, RIGHT, BOTTOM |
| 4-HOLE PUNCHING | LEFT, RIGHT |

(OUTPUT EXAMPLE)
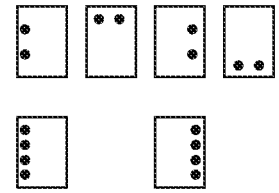

403

| FOLDING TYPE | NUMBER OF FOLDING AND DIRECTION |
|---|---|
| HALF FOLD | NUMBER OF FOLDING: 1<br>DIRECTION: inward OR outward |
| C FOLD | NUMBER OF FOLDING: 2<br>DIRECTION: TWO VALUES ARE DESIGNATED IN SAME DIRECTION |
| Z FOLD | NUMBER OF FOLDING: 2<br>DIRECTION: TWO VALUES ARE DESIGNATED IN DIFFERENT DIRECTIONS |

(OUTPUT EXAMPLE)

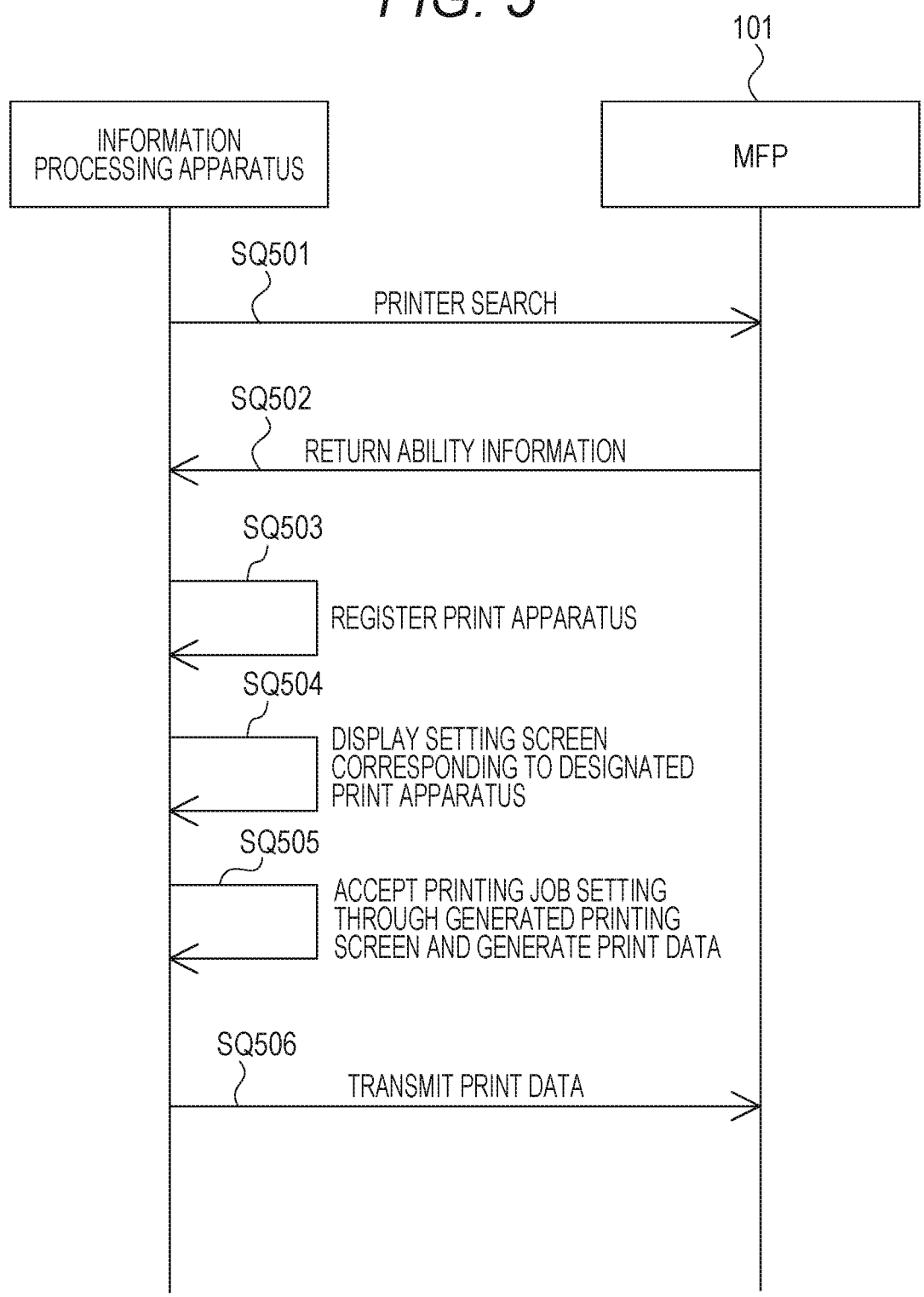

FIG. 6

RESPONSE CONTENT OF MFP 101 (EXTRACT)

```
...
  3: none
  4: staple
 20: staple-top-left
 21: staple-bottom-left
 22: staple-top-right
 23: staple-bottom-right
 28: staple-dual-left
 29: staple-dual-top
 30: staple-dual-right
 31: staple-dual-bottom
...
  5: punch
 74: punch-dual-left
 75: punch-dual-top
 76: punch-dual-right
 77: punch-dual-bottom
 82: punch-quad-left
 84: punch-quad-right
...
 10: fold
 93: fold-half
 96: fold-letter
100: fold-z
...
```

| NUMBER OF BINDING LOCATIONS | BINDING POSITION |
|---|---|
| ONE-LOCATION BINDING | 10mm HORIZONTALLY AND 10mm VERTICALLY FROM SHEET CORNER |
| TWO-LOCATION BINDING | 10mm HORIZONTALLY FROM SHEET EDGE. BINDING PITCH OF 120mm WITH RESPECT TO SHEET CENTER |

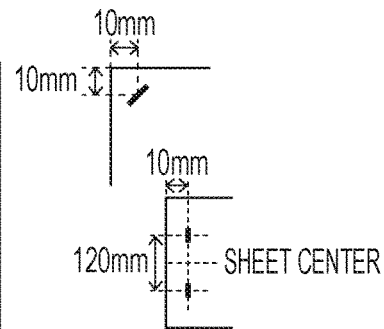

1002

| NUMBER OF PUNCH HOLES | PUNCH HOLE POSITION |
|---|---|
| 2-HOLE PUNCHING | 10mm HORIZONTALLY FROM SHEET EDGE. PUNCH HOLE PITCH OF 80mm WITH RESPECT TO SHEET CENTER |
| 4-HOLE PUNCHING | 10mm HORIZONTALLY FROM SHEET EDGE. PUNCH HOLE PITCH OF 21mm, 70mm, AND 21mm WITH RESPECT TO SHEET CENTER |

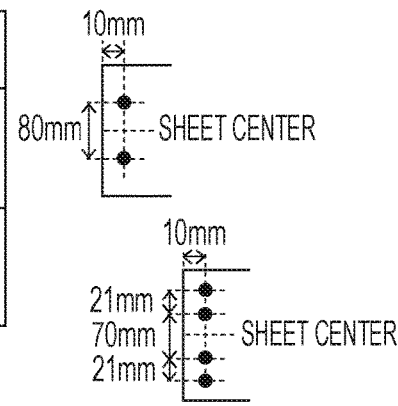

1003

| FOLDING TYPE | FOLDING POSITION |
|---|---|
| HALF FOLD | SHEET CENTER POSITION |
| C FOLD | POSITIONS CORRESPONDING TO THREE EQUALLY FOLDED PARTS OF SHEET |
| Z FOLD | POSITIONS CORRESPONDING TO THREE EQUALLY FOLDED PARTS OF SHEET |

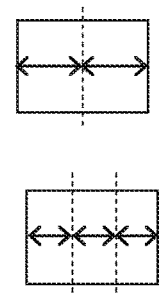

FIG. 14

UNIT [mm]

| SIZE | reference-edge | offset | location | location |
|---|---|---|---|---|
| A3 | top, bottom | 10 | 88.5 | 270 |
| A4 | left, right | 10 | 88.5 | 208.5 |
| | top, bottom | 10 | 45 | 208.5 |
| A5 | left, right | 10 | 45 | 165 |
| | top, bottom | 10 | 14 | 165 |
| B4 | left, right | 10 | 122 | 242 |
| | top, bottom | 10 | 68.5 | 242 |
| B5 | left, right | 10 | 68.5 | 188.5 |
| | top, bottom | 10 | 31 | 188.5 |
| 11×17 | top, bottom | 10 | 79.7 | 275.9 |
| Letter | left, right | 10 | 79.7 | 199.7 |
| | top, bottom | 10 | 47.95 | 199.7 |
| Statement | left, right | 10 | 47.95 | 167.95 |
| | top, bottom | 10 | 9.85 | 167.95 |

PRINT APPARATUS, INFORMATION PROCESSING METHOD, AND STORAGE MEDIUM TO DETERMINE COORDINATE INFORMATION OF PLURAL POSITIONS TO PERFORM POST-PROCESSING ON A PRINTED SHEET

BACKGROUND

Field

The present disclosure relates to a print apparatus, an information processing method, and a program.

Description of the Related Art

A print apparatus that receives print data from an information processing apparatus via a network and performs printing is known.

In recent years, a general-purpose print service provided by an operating system (OS) of an information processing apparatus, a print server on a cloud, or the like, has been developed that generates print data. The print service is transmitted to a print apparatus. It is desirable for such a general-purpose print service to be compatible with various types of print apparatuses, and thus ability information about a print apparatus may need to be managed. For example, Japanese Patent Laid-Open No. 2009-259292 discloses a method for generating print data based on ability information about a print apparatus managed by a print server and performing printing by the print apparatus.

SUMMARY

In various embodiments of the present disclosure, a print apparatus is provided that includes: a printing device; a post-processing device; at least one processor; and at least one memory storing instructions which, when executed by the at least one processor, cause the print apparatus to perform operations of the following units: a printing control unit configured to control the printing device and execute printing based on print data; and an ability response unit configured to transmit, to an external device, ability information including information indicating that post-processing by coordinate designation is unexecutable, upon condition that a transmission request for the ability information about the print apparatus is received from the external device.

Further features will become apparent from the following description of exemplary embodiments with reference to the attached drawings.

BRIEF DESCRIPTION OF THE DRAWINGS

FIG. 4 is a diagram illustrating post-processing according to a first embodiment.

FIG. 5 is a sequence diagram of a series of sequences for receiving print data according to one embodiment.

FIG. 6 is a diagram illustrating an example of ability information to be sent back to an information processing apparatus by the MFP according to one embodiment.

FIG. 11 is a diagram illustrating post-processing according to the second embodiment.

FIG. 14 is a table illustrating an example of a conversion table for two-location binding according to one embodiment.

DESCRIPTION OF THE EMBODIMENTS

Embodiments of the present disclosure will be described below with reference to the drawings.

In a general-purpose print service, print data is generated based on ability information about a print apparatus. In this case, when a vendor that provides a print service is different from a device vendor that provides a print apparatus, print data that cannot be processed by the print apparatus may be generated. For example, in a general-purpose print service, when print data includes designation of post-processing, the designation of the post-processing may be arbitrarily instructed at coordinate positions on a sheet. On the other hand, in the machine structure of an actual print apparatus, the positions where post-processing can be executed are limited in many cases.

This embodiment illustrates a mechanism in which print data received from a general-purpose print service can be appropriately treated even in the print apparatus in which the positions where post-processing can be executed are limited.

First Embodiment

Figure 1:
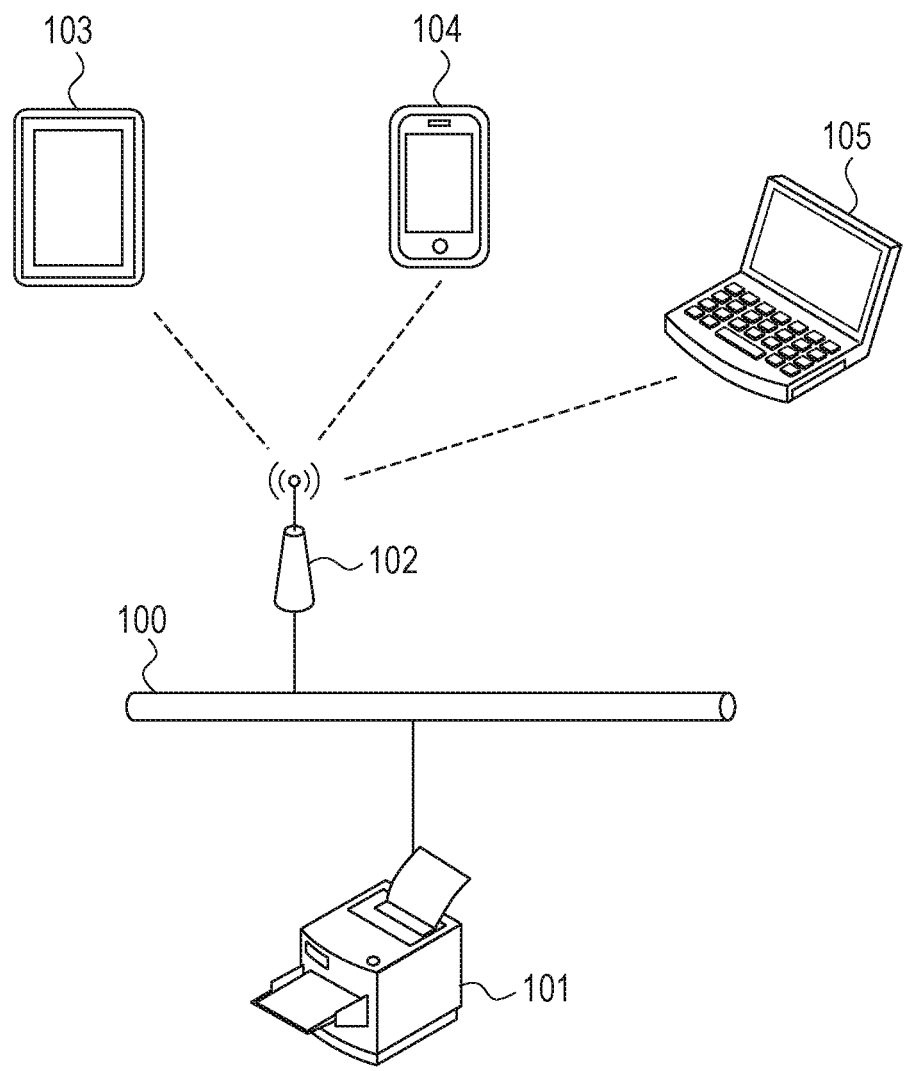
FIG. 1 is a diagram illustrating an example of a system configuration of a print system according to one embodiment.

FIG. 1 is a diagram illustrating an example of a system configuration of a print system. On a LAN (Local Area Network) 100, an MFP (Multifunction Peripheral) 101 and an AP (access point) 102 are connected in such a manner that the MFP and the AP can communicate with each other. This embodiment will be described using the MFP 101 as an example of a print apparatus. Examples of an information processing apparatus will be described using mobile terminals 103 and 104 and a PC (Personal Computer) 105. The information processing apparatuses such as the mobile terminals 103 and 104 and the PC 105 can communicate with the MFP 101 on a network (LAN 100) via the AP 102. The PC 105 may be connected to the LAN 100 with a wire-connected to the LAN 100 via a LAN cable. The above-mentioned configuration will be described as an example of the print system in this embodiment. However, the configuration is not limited to this, as long as one information processing apparatus and the print apparatus are connected via a network in such a manner that the information processing apparatus and the print apparatus can communicate with each other.

First, the MFP 101 will be described. The MFP 101 includes a reading function for reading an image on a document, and a printing function for printing an image on a sheet. The MFP 101 can execute a printing process based on print data received via the network.

Figure 2:
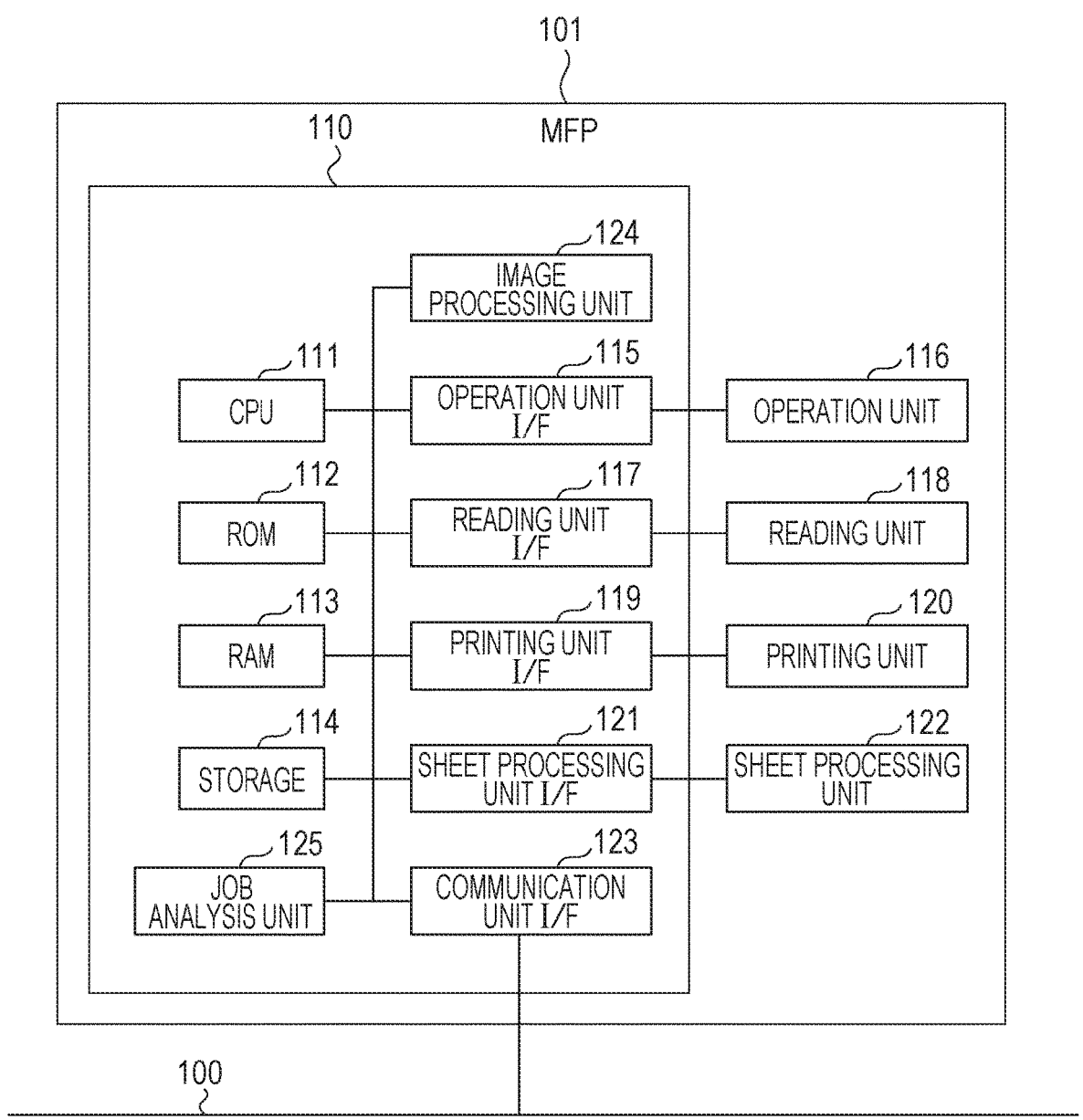
FIG. 2 is a diagram illustrating an example of a hardware configuration of an MFP according to one embodiment.

FIG. 2 is a diagram illustrating an example of a hardware configuration of the MFP 101. The MFP 101 includes a reading function for reading an image on a sheet, and a printing function for printing an image on a sheet. The MFP 101 also includes a file transmission function for transmitting an image to an external information processing apparatus. While this embodiment illustrates the MFP 101 as an example of the print apparatus, the print apparatus is not limited to the MFP. For example, the print apparatus may be, for example, an SFP (Single Function peripheral) which does not include the reading function.

A control unit 110 including a CPU (Central Processing Unit) 111 controls the overall operation of the MFP 101. The CPU 111 reads out a program stored in a ROM (Read Only Memory) 112 or a storage 114, and performs various control operations such as printing control and reading control. The ROM 112 stores a program that can be executed by the CPU 111. A RAM (Random Access Memory) 113 is a main storage memory for the CPU 111 and is used as work area or a temporary storage area for developing various programs. The storage 114 stores print data, image data, various programs, and various pieces of set information. This embodiment assumes an auxiliary storage device, such as an HDD (Hard Disk Drive), as the storage 114, but instead of the HDD, a non-volatile memory such as an SSD (Solid State Drive) may be used. The CPU 111 executes processes based on the program stored in the ROM 112 or the storage 114, thereby implementing the process of the MFP 101 in the sequence diagram of FIG. 5 as described later, and the process in the flowcharts of FIGS. 9, 10, 12, 15, and 16 as described later.

Assume that in the MFP 101 according to this embodiment, one CPU 111 executes processes illustrated in flowcharts and the like, which are described later, using one memory (RAM 113), but instead other modes may be employed. For example, the processes illustrated in the flowcharts and the like, which are described later, may be executed in cooperation with a plurality of CPUs, RAMs, ROMs, and storages. Some of the processes may be executed using a hardware circuit such as an ASIC (Application Specific Integrated Circuit) or an FPGA (Field-Programmable Gate Array).

An operation unit interface (I/F) 115 connects an operation unit 116 and the control unit 110 to each other. The operation unit 116 includes a liquid crystal display unit including a touch panel function, and various hard keys, and functions as an acceptance unit that accepts an instruction from a display unit for displaying information, or a user.

A reading unit I/F 117 connects a reading unit 118 and the control unit 110 to each other. The reading unit 118 reads a document and generates a reading image. The generated reading image is stored in the storage 114 or the RAM 113. The reading image generated by the reading unit 118 is transmitted to the information processing apparatus, and is used for printing of the image on a sheet.

A printing unit I/F 119 connects a printing unit 120 and the control unit 110 to each other. The printing image generated by analyzing the print data is transferred to the printing unit 120 from the control unit 110 through the printing unit I/F 119. The printing unit 120 receives a control command and an image to be printed through the control unit 110, and prints the image on a sheet which is fed from a feed cassette based on the image. The printing method of the printing unit 120 may be an electrophotographic method or an inkjet method. In addition, other printing methods such as a thermal transfer method can also be applied.

Further, the control unit 110 is connected to the LAN 100 through a communication unit I/F 123. The communication unit I/F 123 transmits images and information to the information processing apparatus on the LAN 100, and receives print data and information from the information processing apparatus on the LAN 100.

A job analysis unit 125 analyzes the received print data, and decodes a print setting set to the print data and delivers the print data to an image processing unit 124.

The image processing unit 124 includes a RIP (Raster Image Processor) function for developing print data to generate an image used for printing. Further, the image processing unit 124 can also perform resolution conversion and correction processes on the image obtained by developing the print data. This embodiment assumes that the image processing unit 124 is implemented by a hardware circuit (such as ASIC or FPGA), but the image processing unit is not limited to this. For example, the MFP 101 may further include a processor for image processing, and the processor for image processing may execute an image processing program to implement image processing or a print data developing process. In this case, the processor for image processing and the CPU 111 operate in cooperation to implement the processes in the flowcharts and the like described later. The CPU 111 can also be configured to execute a program for image processing to perform the image processing or the print data developing process. The image processing may be performed by a combination of these processes. The sheet processing unit I/F 121 connects the control unit 110 and a sheet processing unit 122. The sheet processing unit 122 receives the control command from the CPU 111, and performs post-processing on a sheet printed by the printing unit 120 in accordance with the control command. For example, the sheet processing unit 122 executes the post-processing such as alignment of a plurality of sheets, making punch holes in the sheets, binding a plurality of sheets, or folding the sheets. Information about the post-processing function and the post-processing ability of the sheet processing unit 122 is sent to the control unit 110 in advance (e.g., at start-up of the MFP 101) through the sheet processing unit I/F 121, and is stored in the storage 114 or the RAM 113.

Figure 3:
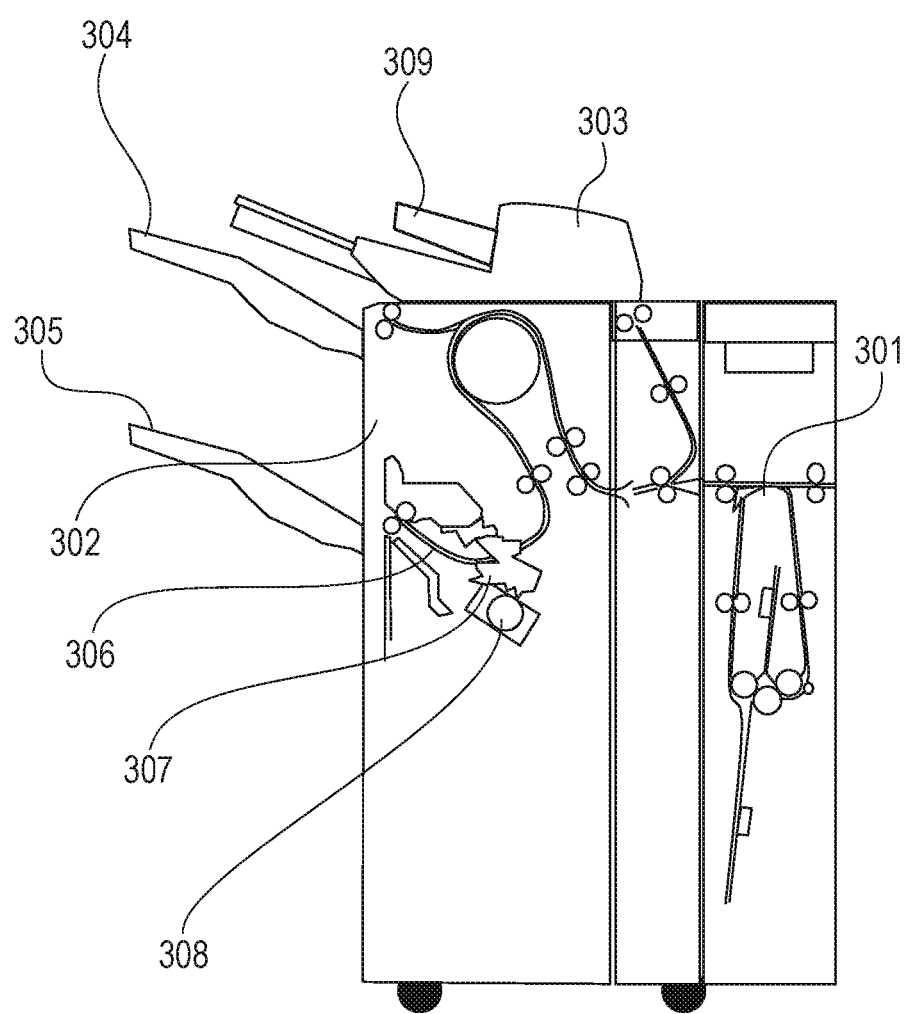
FIG. 3 is a diagram illustrating an example of an inner configuration of a sheet processing unit according to one embodiment.

Next, the inner configuration of the sheet processing unit 122 will be described with reference to the sectional view illustrated in FIG. 3. The sheet processing unit 122 includes a folding machine 301 for performing a folding process on a sheet printed by the printing unit 120, a finisher 302 for performing a binding processing and punching, and an inserter 303. The sheet processing unit 122 includes a sample tray 304 and a stack tray 305. In the case of performing the binding process, the control unit 110 sequentially stacks the sheets printed by the printing unit 120 on a processing tray 306 in the sheet processing unit 122. After a bundle of sheets is stacked on the processing tray, the control unit 110 causes a stapler 307 to perform a stapling process for causing a metallic needle to penetrate through a bundle of sheets and bending a needle tip to sandwich the sheets with a metallic piece. After that, the control unit 110 causes the stapled bundle of sheets to be discharged into the stack tray 305 from the processing tray 306.

In the case of performing the folding process, the control unit 110 executes the folding process by the folding machine 301. Further, the control unit 110 performs control in such a manner that the sheets subjected to the folding process is caused to pass through the inside of the sheet processing unit 122 and the sheets are discharged onto a discharge tray such as the stack tray 305 and the sample tray 304. The sheet processing unit 122 can perform a half-folding processing for folding a sheet in half in response to an instruction designated in the print data. Further, the sheet processing unit 122 can also perform inside 3-fold (also referred to as C fold) for folding a sheet at two positions so that both ends of the sheet are folded inward, and outside 3-fold (also referred to as Z fold) for folding a sheet at two positions so that the folded sheet has a Z-shape.

In the case of performing punching, the control unit 110 executes punching by a puncher 308 on the sheets printed by the printing unit 120. Further, the control unit 110 controls in such a manner that the sheet processing unit 122 is caused to pass and the sheets are discharged onto a discharge tray such as the stack tray 305 and the sample tray 304. The sheet processing unit 122 can perform 2-hole punching for making two holes in the sheets. Further, the sheet processing unit 122 can perform 4-hole punching for making four holes in the sheets.

The sheet processing unit 122 can also perform post-processing on the sheets set on the insert tray 309.

The post-processing that can be performed by the sheet processing unit 122 will be described in detail with reference to FIG. 4.

As described above with reference to FIG. 3, the sheet processing unit 122 includes a post-processing function for executing a binding process, punching, and a folding process, on the sheets. FIG. 4 is a diagram illustrating each post-processing. FIG. 4 also illustrates each output example.

A binding process table 401 is a table illustrating the binding process that can be performed by the sheet processing unit 122. As for the number of binding locations, one-location binding and two-location binding can be employed. The one-location binding can be performed at locations including top left, bottom left, top right, and bottom right. The two-location binding can be performed at locations including left, top, right, and bottom.

A punching table 402 is a table illustrating punching that can be performed by the sheet processing unit 122. The sheet processing unit 122 can perform 2-hole punching and 4-hole punching as punching to be performed on the sheets.

In the case of performing 2-hole punching, punching can be executed at any one of the ends of a left end, an upper end, a right end, and a lower end of each sheet. On the other hand, in the case of performing 4-hole punching, punching can be executed at any one of ends on a long side of each sheet.

A folding process table 403 is a table illustrating the folding process that can be performed by the sheet processing unit 122. The sheet processing unit 122 can perform half fold, C fold, and Z fold, as sheet folding types. In the case of a half fold, an inside fold (inward) and an outside fold (outward) can be set as a folding direction.

In the case of the Z fold, as illustrated in the output example, each sheet can be folded at two positions so that the folded sheet has a Z-shape. In the case of the C fold, as illustrated in the output example, each sheet can be folded at two positions so that both ends of the sheet are folded inward.

Information about the post-processing that can be performed by the sheet processing unit 122 illustrated in FIG. 4 is stored in the storage 114 or the RAM 113 as the ability information about the sheet processing unit 122.

Next, exchange of information between the information processing apparatus and the MFP 101 will be described with reference to FIG. 5. FIG. 5 is a sequence diagram illustrating a series of sequences in which the MFP 101 receives print data from the information processing apparatus. First, in SQ 501, the information processing apparatuses such as the mobile terminals 103 and 104 and the PC 105 broadcast a packet for searching a printer on the LAN 100. In SQ 502, upon receiving a packet for searching a print apparatus, the MFP 101 sends back the ability information included in the MFP 101 to the information processing apparatus which has transmitted the packet. This ability information includes information representing the ability of each print apparatus. As specific ability information, a list of functions supported by the MFP 101, such as supported sheet sizes, the presence or absence of a double-side printing function, and executable post-processes, is described. In SQ 503, the information processing apparatus can register the ability information of the MFP about supported sheet sizes, the presence or absence of the double-side printing function, and the type of each executable post-processing, by using the received ability information. The packet for searching a printer is an example of a transmission request for the ability information. The user can request the print apparatus registered in the primary registration process (501 to 503) to perform printing. In SQ 504, upon accepting the designation of the print apparatus used for printing through a user's operation, the print service included in the information processing apparatus refers to the ability information corresponding to the print apparatus designated by the user. The print service displays a setting screen for setting a print property based on the referenced ability information on an operation unit of the information processing apparatus. The user sets a print property through the setting screen. In SQ 505, upon accepting an instruction to start printing through the setting screen, the information processing apparatus generates print data. The generated print data is transmitted to the MFP 101.

The ability information to be exchanged in SQ 502 will now be described in detail.

FIG. 6 illustrates an example of ability information to be sent back to the information processing apparatus by the MFP 101. This is an example in which ability information about post-processing is notified using simple enumerated values.

Reference numeral 4 in FIG. 6: Staple is intended to instruct the MFP 101 to bind sheets, and the number of binding locations, binding positions, and the like are determined by the print apparatus. In 20 to 23, top left, bottom left, top right, and bottom right are designated as binding positions in one-location binding. As indicated by reference numerals 28 to 31, left, top, right, and bottom are designated as binding positions in two-location binding.

Reference numeral 5 in FIG. 6: Punch is intended to instruct the MFP 101 to make punch holes in each sheet, and the number of punch holes, the positions of the punch holes, and the like are determined by the print apparatus. As indicated by reference numerals 74 to 77, left, top, right, and bottom are designated a punch positions in 2-hole punching. As indicated by reference numerals 82 and 84, left and right are designated as punch positions in 4-hole punching.

Reference numeral 10 in FIG. 6: Fold is intended to instruct the MFP 101 to fold each sheet, and the folding position and the folding direction are determined by the print apparatus. Reference numerals 93, 96, and 100 are intended to instruct half fold, 3-fold, and Z fold, respectively.

Thus, when simple enumerated ability information as illustrated in FIG. 6 is used, the sheet processing unit 122 illustrated in FIG. 4 sends back an ability response properly within the range of the post-processing that can be implemented.

On the other hand, since the post-processing is instructed in more detail, there is a method for instructing a post-processing position in coordinate value representation on a sheet. Specific examples thereof will be described with reference to FIG. 7 (an instruction method in coordinate representation) and FIG. 8 (an ability response for coordinate representation).

Figure 7:
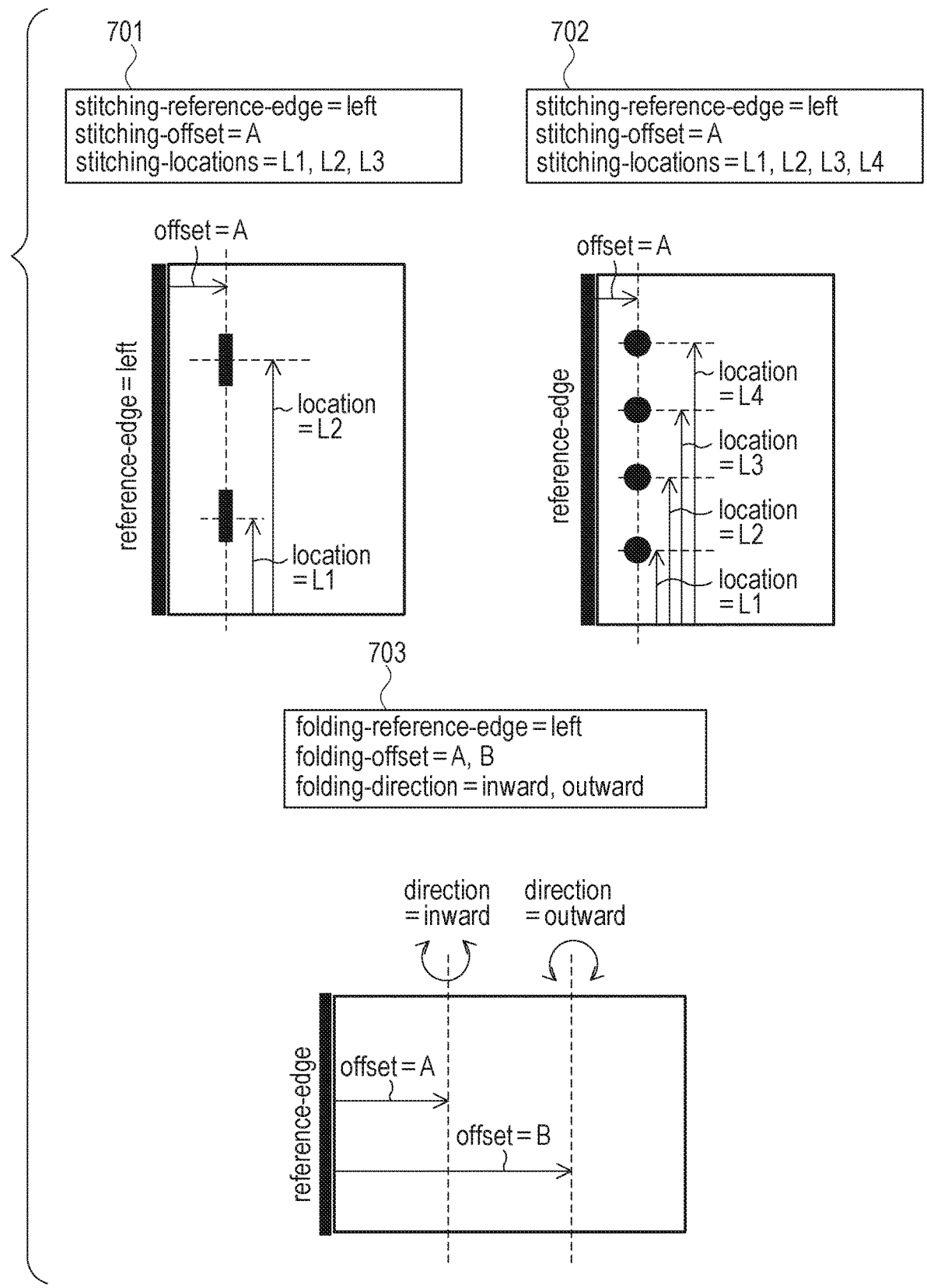
FIG. 7 is a diagram illustrating an example of an instruction method in coordinate representation according to one embodiment.

FIG. 7 is a diagram illustrating a method for designating post-processing using coordinate positions. This embodiment illustrates a post-processing designation method using coordinate positions based on IPP (Internet Printing Protocol) Finishings 2.0 advocated by PWG (Printer Working Group) which is one of the IEEE standardization working groups. In addition, a case where an ability response in IPP Finishings 2.0 is requested by a print service will be described.

In the case of designating the binding process using coordinate positions, as illustrated in 701, the binding process is set using three parameters of stitching-reference-edge, stitching-offset, and stitching-locations. The stitching-reference-edge is used to determine an edge at which the binding process is executed. A left edge (left), a right edge (right), a top edge (top), and a bottom edge (bottom) can be designated as the edge. The stitching-offset represents, as an offset, the position where the binding process is actually executed based on an end of the edge at which the binding process is executed. For example, when 20 mm is designated as the stitching-offset, the binding process is performed at a position 20 mm inward from an end of the edge.

The stitching-locations represents a value for determining the position where the binding process is performed. The position where the actual binding process is executed is designated based on one end of an edge perpendicular to the edge designated as the stitching-reference-edge. When left or right is designated as the stitching-reference-edge, the position based on an end of a bottom edge of a sheet is designated as the stitching-locations.

In the case of parameters illustrated in 701, the binding process is performed on L1 and L2 which are located "A" mm inward from the left edge of the sheet.

In the case of designating punching by coordinate position designation, as illustrated in 702, punching is set using three parameters of punching-reference-edge, punching-offset, and punching-locations. The punching-reference-edge is used to determine an edge at which punching is executed. A left edge (left), a right edge (right), a top edge (top), and a bottom edge (bottom) can be designated as the edge. The punching-offset represents, as an offset, the position where punching is actually executed based on an end of the edge at which punching is executed. For example, when 20 mm is designated as the punching-offset, punching is performed at a position 20 mm inward from an end of the edge.

The punching-locations represents a value for determining a position where punching is performed. The position where the actual punching is executed is designated based on one end of an edge perpendicular to the edge designated as the punching-reference-edge. When left or right is designated as the punching-reference-edge, the position based on an end of a bottom edge of a sheet is designated as the punching-locations.

In the case of parameters illustrated in 702, punching is performed at L1, L2, L3, and L4 which are located "A" mm inward from the left edge of the sheet.

In the case of designating the folding process by coordinate position designation, as illustrated in 703, the folding process is set using three parameters of folding-reference-edge, folding-offset, and folding-direction. The folding-reference-edge is used to determine an edge at which the folding process is executed. A left edge (left), a right edge (right), a top edge (top), and a bottom edge (bottom) can be designated as the edge. The folding-offset represents, as an offset, the position at which the folding process is actually executed based on an end of the edge at which the folding process is executed. A plurality of folding-offsets can be set. For example, when 100 mm and 200 mm are designated as the folding-offsets, the folding process is performed at a position 100 mm inward from the end of the edge and at a position 200 mm inward from the end of the edge. The folding-direction represents a value for determining which one of an inside fold (inward) and an outside fold (outward) is performed at each folding position determined by the folding-offsets.

In the case of parameters illustrated in 703, The inside fold process is performed at a position located "A" mm inward from the left edge of the sheet, and the outside fold process is performed at a position located "B" mm inward from the left edge of the sheet.

Figure 8:
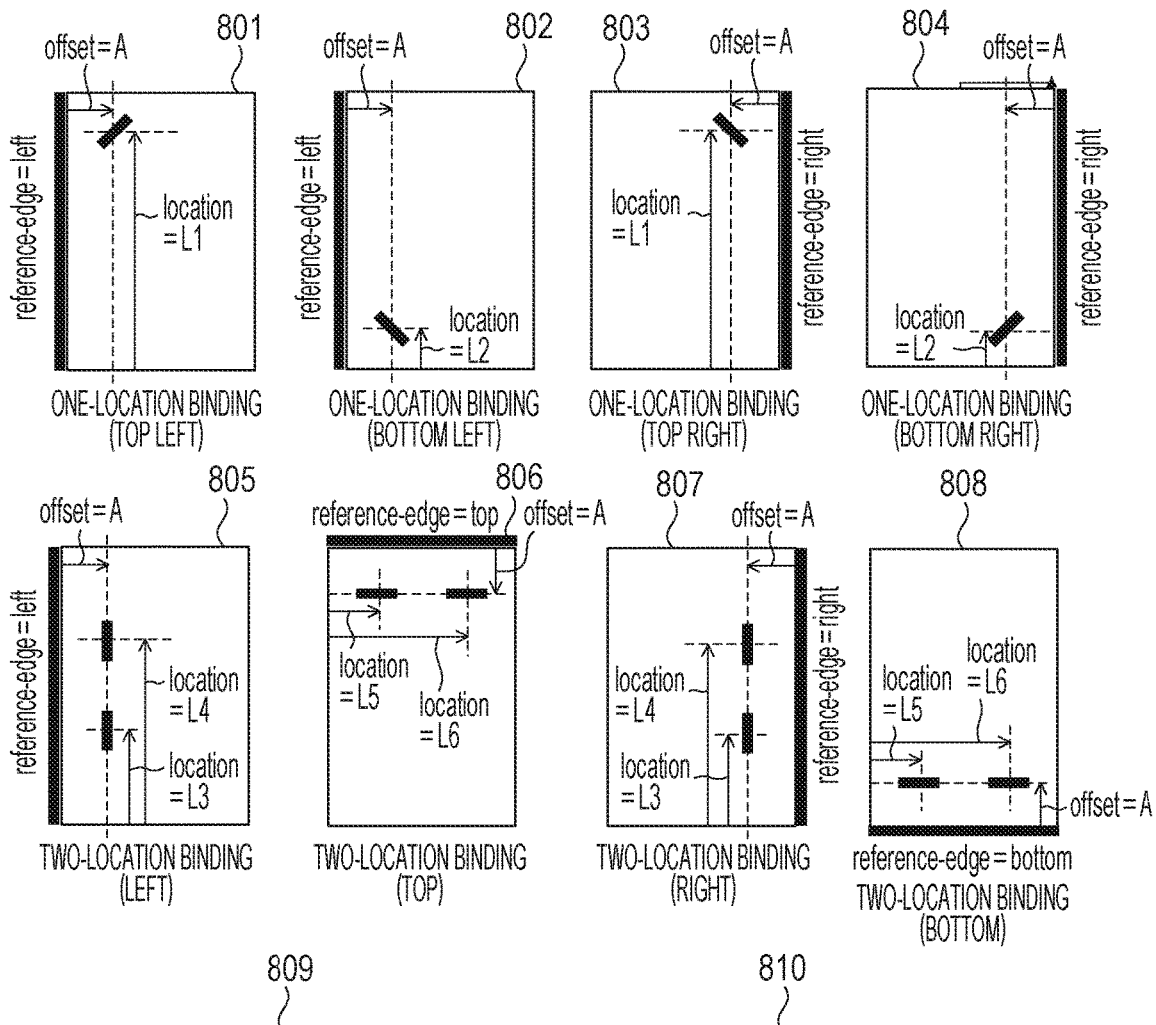
FIG. 8 is a diagram illustrating an example of details of coordinate position designation and an ability response for coordinate representation according to one embodiment.

Next, details of the coordinate position designation in the binding process and an example of the ability response will be described with reference to FIG. 8. The binding process is herein described by way of example.

As described above with reference to FIGS. 3 and 4, the binding process that can be performed by the sheet processing unit 122 includes one-location binding and two-location binding. Top left, bottom left, top right, and bottom right can be selected as the binding position in one-location binding. Left, top, right, and bottom can be selected as the binding position in two-location binding. Reference numerals 801 to 808 indicate diagrams illustrating these binding processes represented by coordinate position designation.

In the case of one-location binding, when top left and bottom left are designated as the binding positions, reference-edge=left holds, and when top right and bottom right are designated as the binding positions, reference-edge=right holds. All offsets satisfy offset=A, regardless of the binding position. As for location, when top left and top right are designated as the binding position, location=L1 holds, and when bottom left and bottom right are designated as the binding position, location=L2 holds.

In the case of two-location binding, when left is designated as the binding position, reference-edge=left holds; when top is designated as the binding position, reference-edge=top holds; when right is designated as the binding, reference-edge=right holds; and when bottom is designated as the binding position, reference-edge=bottom holds. All offsets satisfy offset=A, regardless of the binding position. As for the location, when left and right are designated as the binding position, location=L3, L4 holds, and when top and bottom are designated as the binding position, location=L5, L6 holds.

An ability response for setting post-processes by coordinate designation may be sent back to the print service so that these detailed post-processes can be set. In this case, when the ability is notified so that all post-processes 801 to 808 that can be executed by the MFP 101, the ability indicated by 809 is sent back as the ability response. This ability response includes all values designated in 801 to 808.

However, ability information indicated by reference numeral 809 cannot correctly represent the ability of the binding process of the sheet processing unit 122. For example, the number of binding locations supported by the sheet processing unit 122 is one-location binding or two-location binding, while six stitching-locations-supported are designated in the ability response indicated by reference numeral 809. Thus, it can be interpreted that binding at six locations is supported.

Although the position L1 in one-location binding and the position L3 in two-location binding cannot be designated at the same time, such prohibitions cannot be represented in the ability response indicated by reference numeral 801. Accordingly, there is a possibility that the positions may be designated at the same time. These problems are also common in the punch hole process and the folding process.

Specifically, when a post-processing instruction sent from the print service of the information processing apparatus or the like uses the coordinate position designation on the sheet as illustrated in FIG. 7, the ability information cannot be correctly notified. Accordingly, there is a possibility that the print data including an instruction that is not supported by the print apparatus may be received.

In view of the above, this embodiment illustrates a case where control is performed in such a manner that a specific ability for performing coordinate designation is sent back to the print service requesting for the post-processing ability information based on IPP Finishing 2.0 so that the post-processing using coordinate designation is designated.

Figure 9:
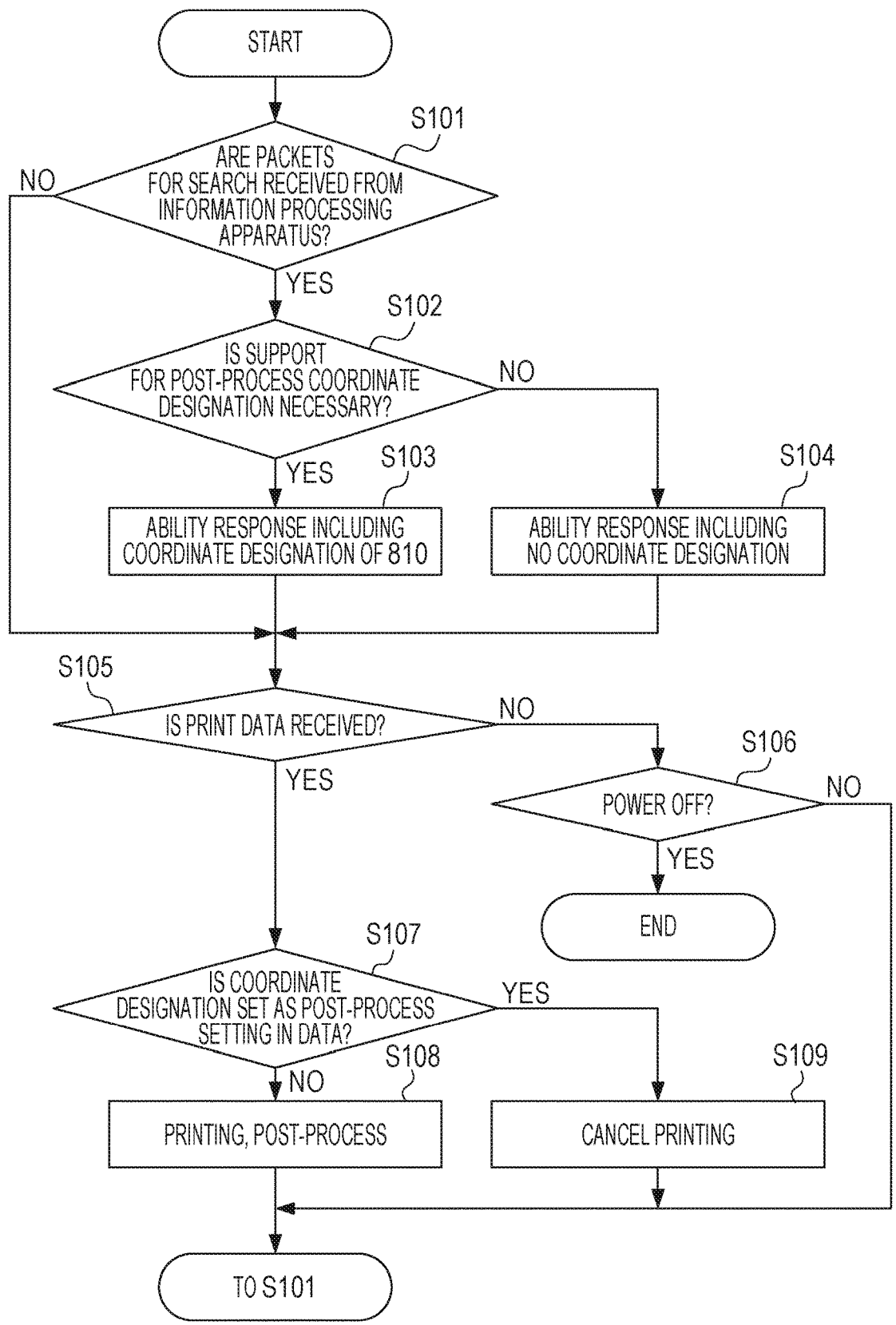
FIG. 9 is a flowchart illustrating an example of main information processing according to the first embodiment.

The ability response to the print service of the MFP 101 and the control for reception of print data will be described with reference to the flowchart of FIG. 9.

In S101, the CPU 111 determines whether or not a packet for searching a printer is received from the information processing apparatus via the LAN 100. When the CPU 111 receives the packet for searching a printer from the information processing apparatus, the CPU 111 advances the process to S102, and when the CPU 111 does not receive the packet for searching a printer from the information processing apparatus, the CPU 111 advances the process to S105.

In S102, the CPU 111 determines whether or not there is a need for support of the post-processing coordinate designation. More specifically, the CPU 111 determines whether the print service of the sender corresponds to the print service requesting for support of the post-processing coordinate designation, based on information of the sender included in the search packet. When the CPU 111 determines that the print service of the sender corresponds to the print service requesting for support of the post-processing coordinate designation, the CPU 111 advances the process to S103. On the other hand, when the CPU 111 determines that the print service of the sender is a print service that does not request for support of the post-processing coordinate designation, the CPU 111 advances the process to S104.

In S103, the CPU 111 performs the ability response indicating that the post-processing using coordinate designation is unexecutable. The ability information to be notified includes the functions supported by the MFP 101, such as information (a simple response illustrated in FIG. 6) about supported sheet sizes, the presence or absence of the double-side printing function, and executable post-processes. The CPU 111 also sends, as the ability response, ability information about the designation of post-processing using coordinate designation. In this case, as indicated by reference numeral 810 in FIG. 8, setting items necessary for designation of post-processing using coordinate designation are enumerated, and a value that cannot be used by the functions of the sheet processing unit 122, such as NULL for set values corresponding to the setting items, is sent.

By the process of S103, even in the case of the print service requesting for support of coordinate designation, information indicating that post-processing designation using coordinate designation cannot be performed can be sent to the print service. Accordingly, the print data that is set to be unexecutable by the MFP 101 can be prevented from being transmitted from the print service.

On the other hand, in S104, the CPU 111 performs an ability response that does not include the ability of the post-processing using coordinate designation.

In S105, the CPU 111 determines whether or not print data is received from the information processing apparatus. When the CPU 111 receives the print data from the information processing apparatus, the CPU 111 advances the process to S107, and when the CPU 111 does not receive the print data from the information processing apparatus, the CPU 111 advances the process to S106.

In S106, the CPU 111 determines whether or not an instruction for turning off the power supply of the MFP 101 is accepted. Upon detecting that a power supply button of the MFP 101 is pressed, the CPU 111 terminates a series of processes, and when the power supply button of the MFP 101 is not pressed, the CPU 111 returns to the process of S101 and waits for receiving a packet or print data.

In S107, the CPU 111 determines whether or not the post-processing using coordinate designation in the print data received in S105 is set. The CPU 111 analyzes the print data received in S105 in cooperation with the job analysis unit 125. When the post-processing using coordinate designation is set as a post-processing setting for the analyzed print data, the CPU 111 advances the process to S109, and when the post-processing using coordinate designation is not set as the post-processing setting for the analyzed print data, the CPU 111 advances the process to S108.

In S108, the CPU 111 executes printing based on the print data in cooperation with the printing unit 120. On the sheets printed by the printing unit 120, post-processing is executed, as needed, according to the post-processing setting designated in the print data. When the CPU 111 executes post-processing, the CPU 111 controls the sheet processing unit 122 to convey the printed sheets to the position where the folding machine 301, the stapler 307, or the puncher 308 is executed, to thereby execute each post-processing. The sheets on which each post-processing is executed are discharged onto the stack tray 305. When printing is completed, the process returns to S101.

On the other hand, in S109, the CPU 111 cancels printing based on the print data received in S105, and returns to S101.

As described above, according to the information processing of this embodiment, control can be performed in such a manner that a specific ability for performing coordinate designation is not sent back to the print service requesting for the ability so that the post-processing using coordinate designation is designated.

Accordingly, the print data that is set to be unexecutable by the MFP 101 can be prevented from being received from the print service.

Second Embodiment

The first embodiment illustrates the method in which control is performed in such a manner that a specific ability for performing coordinate designation is not sent back and print data set to be unexecutable is prevented from being received.

A second embodiment illustrates a control operation to be performed when print data for which post-processing using coordinate designation is designated is supported. However, as described above with reference to FIG. 8, if the ability response as indicated by reference numeral 809 is simply sent to the information processing apparatus, the print apparatus may receive the print data including an instruction that is not supported.

In view of the above, a mechanism for determining whether the designation can be executed by the sheet processing unit 122 included in the MFP 101, upon condition that the MFP 101 of this embodiment receives print data for which the post-processing using coordinate designation is designated from the information processing apparatus will be described. In this embodiment, the CPU 111 converts the ability of the sheet processing unit 122 included in the MFP 101 into a representation of the post-processing using coordinate designation, and compares the converted value with a setting of the post-processing using coordinate designation included in print data. Further, based on the comparison result, the CPU 111 determines whether or not the CPU 111 can execute the post-processing.

Note that in the second embodiment, the basic hardware configuration of the apparatus is similar to that of the first embodiment. Detailed descriptions of components of the second embodiment that are similar to those of the first embodiment are omitted.

Specific processing of this embodiment will be described below with reference to the flowchart of FIG. 10.

Figure 10:
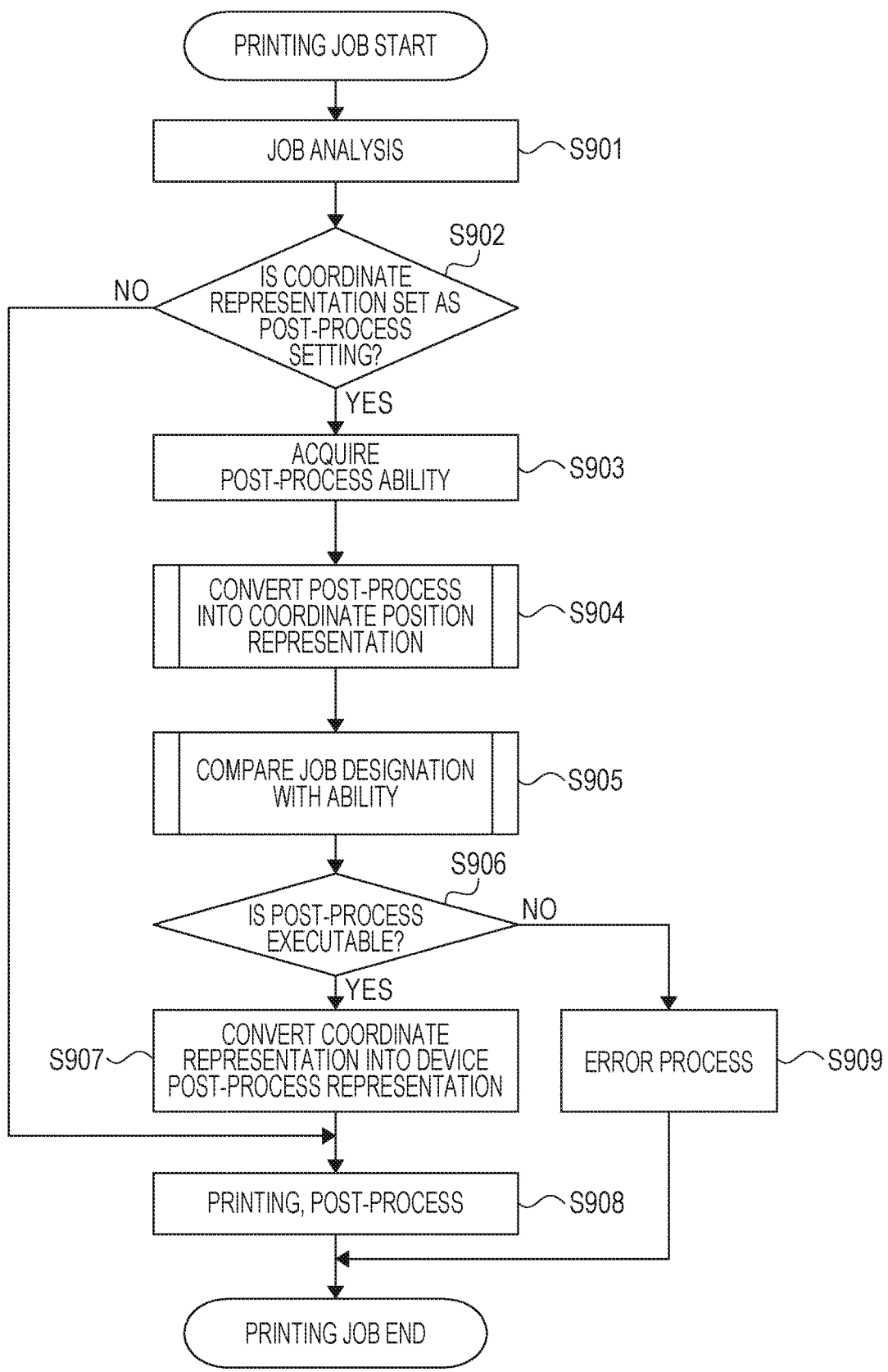
FIG. 10 is a flowchart illustrating an example of main information processing according to a second embodiment.

FIG. 10 is a flowchart when the MFP 101 has received print data.

In S901, the CPU 111 analyzes the received print data in cooperation with the job analysis unit 125.

In S902, as a result of the analysis in S901, the CPU 111 determines whether or not the post-processing using coordinate designation is designated in the print data. When the post-processing using coordinate designation is not designated in the print data (specifically, when a simple enumerated post-processing as illustrated in FIG. 6 is designated in the print data, or when no post-processing is designated in the print data), the CPU 111 advances the process to S908. On the other hand, when there is print data for which the post-processing using coordinate designation is designated, the CPU 111 advances the process to S903.

In S903, the CPU 111 acquires the ability of the sheet processing unit 122. The acquired post-processing ability includes various process abilities described above with reference to FIG. 4 and the process position ability illustrated in FIG. 11. The CPU 111 may acquire these pieces of information from the sheet processing unit 122, or may acquire the information stored in advance (e.g., at start-up of the MFP 101) in the storage 114 or the RAM 113.

FIG. 11 is a diagram illustrating the ability of the sheet processing unit 122 that is acquired in S903.

First, the ability of the binding process that can be executed by the sheet processing unit 122 will be described.

A binding position table 1001 stores binding positions used in one-location binding and two-location binding. As the ability for one-location binding, the binding process can be performed at a position 10 mm horizontally and 10 mm vertically from a corner of a sheet.

In the case of two-location binding, information indicating that the binding process can be performed at a position that is located 10 mm horizontally from an edge of a sheet and the distance (binding pitch) between binding positions with respect to the center of the sheet is 120 mm is stored.

Next, the ability of punching will be described. A punching position table 1002 stores punch hole positions used for 2-hole punching and 4-hole punching. In the case of 2-hole punching, information indicating that punching is performed at a position that is located 10 mm horizontally from an edge of a sheet and the distance (punch hole pitch) between punch holes with respect to the center of the sheet is 80 mm is stored. In the case of 4-hole punching, information indicating that punching is performed at positions that are located 10 mm horizontally from an edge of a sheet and the punch hole pitches with respect to the center of the sheet are 21 mm, 70 mm, 21 mm, respectively, from the bottom.

Next, the ability of the folding process will be described. A folding position table 1003 stores information about positions where the folding process is executed for each folding type. In the case of a half fold, information indicating that the folding process is performed at a central position of a sheet is stored. In the case of a C fold and a Z fold, the folding process can be performed at positions corresponding to three parts into which the sheet is folded.

Referring back to the description of FIG. 10, in S904, the CPU 111 converts the post-processing ability acquired in S903 into a format for designating post-processing using coordinate designation.

As described above with reference to FIG. 11, some abilities of post-processes by the sheet processing unit 122 are defined based on the center of a sheet to be conveyed. Accordingly, in order to determine whether or not the post-processing using coordinate designation can be executed, it is necessary to convert the ability of the sheet processing unit 122 into coordinates (location) of the post-processing based on one end of a sheet as indicated by reference numerals 801 to 808 in FIG. 8.

The conversion process of S904 will be described in detail with reference to the flowchart of FIG. 12.

In S1101, the CPU 111 acquires a post-processing setting included in the print data analyzed in S901.

In S1102, the CPU 111 determines whether or not the binding setting is included as the post-processing setting. When the binding setting is included as the post-processing setting, the CPU 111 advances the process to S1103, and when the binding setting is included as the post-processing setting, the CPU 111 advances the process to the S1105.

In S1103, the CPU 111 acquires the sheet size used for printing that is included in the print data analyzed in S901.

In S1104, the CPU 111 converts the binding process illustrated in FIGS. 4 and 11 into a coordinate position representation in the sheet size instructed by a job. A more specific conversion process will be described with reference to FIG. 13.

Figure 13:
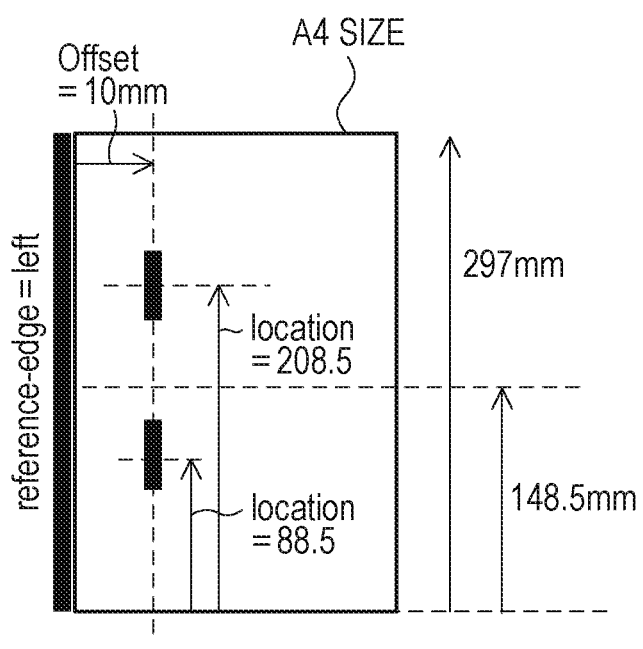
FIG. 13 is a diagram illustrating an example of a coordinate position and the like of the post-processing ability of a sheet processing unit according to one embodiment.
Figure 15:
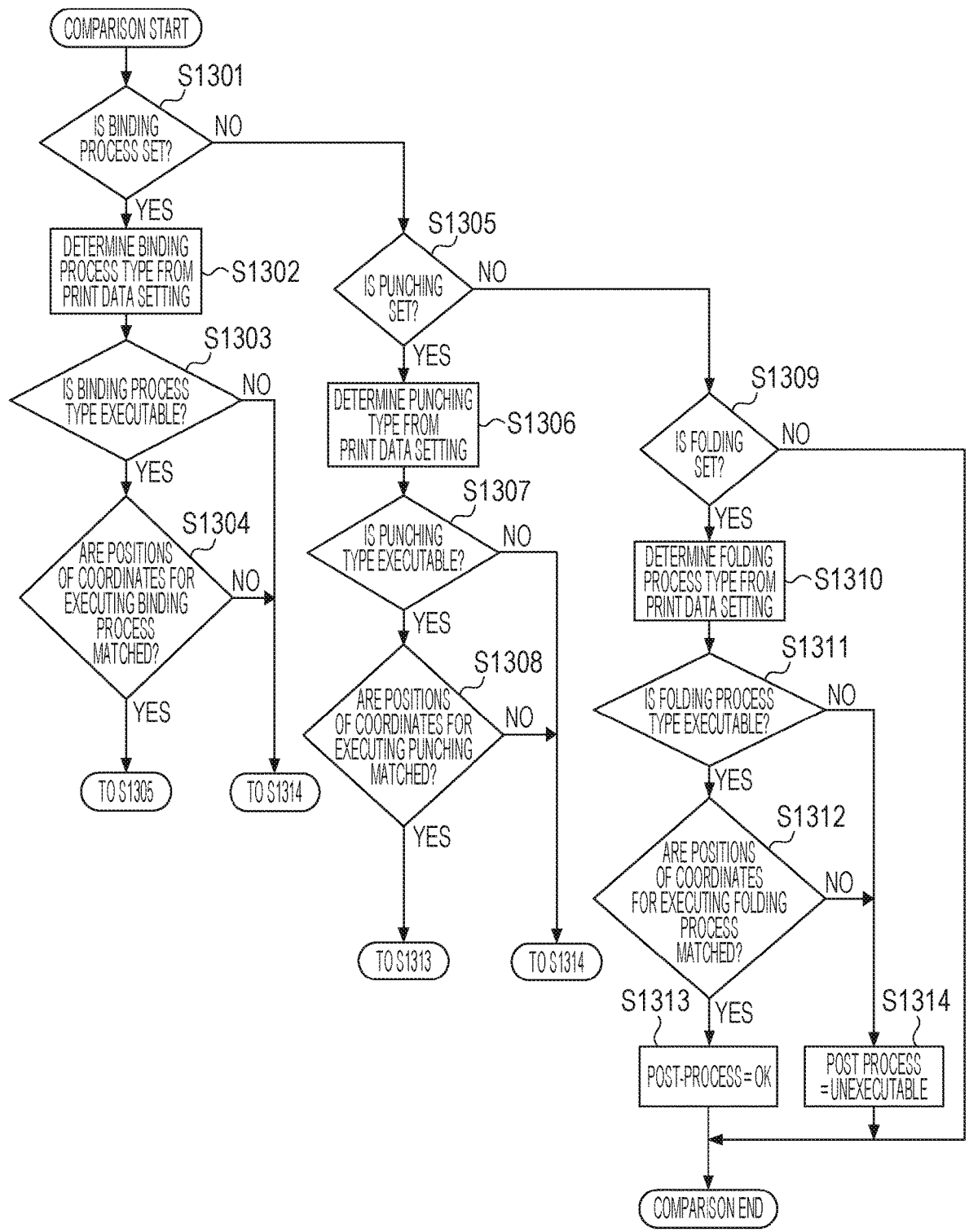
FIG. 15 is a flowchart illustrating details of a comparison process in S905 according to one embodiment.

FIG. 13 illustrates an example in which the post-processing ability of two-location binding (left) is converted into a representation of post-processing using coordinate designation in the sheet of A4 size.

Assume herein that A4 is designated as a sheet size used for printing in the print data.

For left binding, reference-edge, which represents an edge at which the binding process is executed, is left. Referring to the binding position table 1001, an offset is 10 mm. In the case of two-location binding, the ability can be calculated by converting the ability based on the center of a sheet in accordance with A4 size by referring to the binding position table 1001. In the case of two-location binding, the binding process is performed at a position with a binding pitch of 120 mm. The positions converted into location are 208.5 mm, which is obtained by adding a half pitch (60 mm) from the center (148.5 mm) of the A4 sheet size, and 88.5 mm, which is obtained by subtracting a half pitch (60 mm). As described later, the CPU 111 compares this value with the location designated as a setting as a post-setting for the print data, thereby determining whether or not the process can be performed by the MFP 101.

Note that it is necessary to perform coordinate position conversion of the post-processing ability for each sheet size used for printing. This embodiment illustrates a case where the ability conversion is performed when print data is received, but the ability conversion is not limited to this. For example, a table based on the ability of the sheet processing unit 122 included in the MFP 101 for each sheet size that can be used by the MFP 101 may be created in advance. In the case of creating the table in advance, the CPU 111 may refer to the table, instead of performing the ability conversion in S904.

FIG. 14 is a table illustrating an example of a conversion table for two-location binding.

Figure 12:
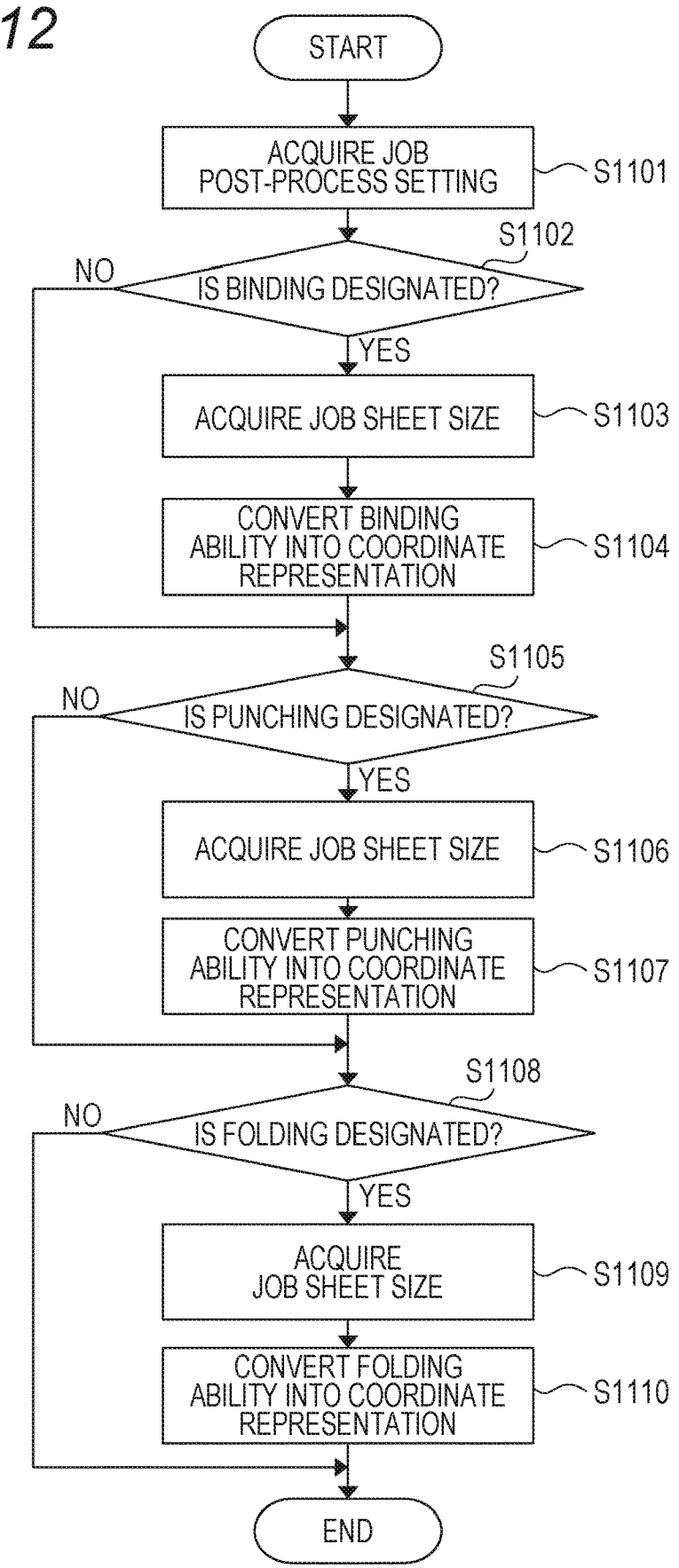
FIG. 12 is a flowchart illustrating details of a conversion process in S904 according to one embodiment.

Referring back to the flowchart of FIG. 12, the description is continued.

In S1105, the CPU 111 determines whether or not the punching setting is included as the post-processing setting. When the punching setting is included as the post-processing setting, the CPU 111 advances the process to S1106. On the other hand, when the punching setting is not included as the post-processing setting, the CPU 111 advances the process to S1108.

In S1106, the CPU 111 acquires the sheet size used for printing that is included in the print data analyzed in S901.

In S1107, the CPU 111 converts the ability of punching illustrated in FIGS. 4 and 11 into a coordinate position representation in the sheet size designated by a job. The concept of the conversion process is similar to that illustrated in FIG. 13, and thus the description thereof is omitted.

In S1108, the CPU 111 determines whether or not the folding process setting is included as the post-processing setting. When the folding process setting is included as the post-processing setting, the CPU 111 advances the process to S1109. On the other hand, when the folding processing setting is not included as the post-processing setting, the CPU 111 advances the process to S905.

In S1109, the CPU 111 acquires the sheet size used for printing that is included in the print data analyzed in S901.

In S1110, the CPU 111 converts the ability of the folding process illustrated in FIGS. 4 and 11 into a coordinate position representation in the sheet size designated by a job. The concept of the conversion process is similar to that illustrated in FIG. 13, and thus the description thereof is omitted.

Referring back to the flowchart of FIG. 10, the process of S905 and subsequent steps will be described.

In S905, the CPU 111 compares the job setting with the post-processing ability converted into a coordinate position representation in S904. Details of the process will be described with reference to the flowchart of FIG. 15.

In S1301, the CPU 111 determines whether or not the binding process setting is included as the post-processing setting for the print data analyzed in S901. When the binding process setting is included as the post-processing setting, the CPU 111 advances the process to S1302. On the other hand, when the binding process setting is not included as the post-processing setting, the CPU 111 advances the process to S1305.

In S1302, the CPU 111 determines the type of the binding process based on the binding process setting in the print data. The CPU 111 determines the type of the binding process in the print data based on the number of stitching-locations. For example, when two coordinates are designated as stitching-locations, the CPU 111 determines that the type of the binding process is two-location binding. Further, when one coordinate is designated as stitching-locations, the CPU 111 determines that the type of the binding process is one-location binding. Further, when three or more coordinates are designated as stitching-locations, the CPU 111 determines that the type of the binding process is multiple-location binding.

In S1303, the CPU 111 determines whether or not the binding process of the type determined in S1302 can be executed by the sheet processing unit 122. The CPU 111 refers to the type of the binding process that can be executed by the sheet processing unit 122 in the binding process table 401 illustrated in FIG. 4. In this example, one-location binding or two-location binding can be executed. When the type of the binding process determined in S1302 is the binding process of the type that can be executed by the sheet processing unit 122, the CPU 111 advances the process to S1304. On the other hand, when the type of the binding process determined in S1302 is the binding process of the type that can be executed by the sheet processing unit 122, the CPU 111 advances the process to S1314.

In S1304, the CPU 111 determines whether or not the coordinates (stitching-locations) on which the binding process included in the print data is executed match the coordinates based on the ability of the sheet processing unit 122 that are calculated in S904. When the coordinates match, the CPU 111 advances to S1305, and when the coordinates do not match, the CPU 111 advances to S1314.

In S1314, the CPU 111 stores information indicating that the post-processing based on the print data is unexecutable in the RAM 113, and advances the process to S907.

In S1305, the CPU 111 determines whether or not the punching setting is included as the post-processing setting for the print data analyzed in S901. When the punching setting is included as the post-processing setting, the CPU 111 advances the process to S1306. On the other hand, when the punching setting is not included as the post-processing setting, the CPU 111 advances the process to S1309.

In S1306, the CPU 111 determines the type of punching based on the punching setting in the print data. The CPU 111 determines the type of punching in the print data based on the number of punching-locations. For example, when two coordinates are designated as punching-locations, the CPU 111 determines that the type of punching is 2-hole punching. Further, when four coordinates are designated as punching-locations, the CPU 111 determines that the type of punching is 4-hole punching. Further, when five or more coordinates are designated as punching-locations, the CPU 111 determines that the type of punching is multiple-hole punching.

In S1307, the CPU 111 determines whether or not punching of the type determined in S1306 can be executed by the sheet processing unit 122. The CPU 111 refers to the type of punching that can be executed by the sheet processing unit 122 in the punching table 402 illustrated in FIG. 4. In this example, 2-hole punching or 4-hole punching can be executed. When the type of punching determined in S1306 is punching of the type that can be executed by the sheet processing unit 122, the CPU 111 advances the process to S1308. On the other hand, when the type of punching determined in S1306 is not punching of the type that can be executed by the sheet processing unit 122, the CPU 111 advances the process to S1314.

In S1308, the CPU 111 determines whether coordinates (punching-locations) on which punching included in the print data is executed match the coordinates based on the ability of the sheet processing unit 122 that are calculated in S904. When the coordinates match, the CPU 111 advances to S1313, and when the coordinates do not match, the CPU 111 advances to S1314.

In S1314, the CPU 111 stores information indicating that the post-processing based on the print data is unexecutable in the RAM 113, and advances the process to S907.

In S1309, the CPU 111 determines whether or not the folding process setting is included as the post-processing setting for the print data analyzed in S901. When the folding process setting is included as the post-processing setting, the CPU 111 advances the process to S1310. On the other hand, when the folding process setting is not included as the post-processing setting, the CPU 111 advances the process to S906.

In S1310, the CPU 111 determines the type of the folding process based on the folding process setting in the print data. The CPU 111 determines the type of the folding process in the print data based on the number of folding-offsets and the value of folding-direction. For example, when two coordinates are designated as folding-offset and two values are designated as folding-direction in the same direction, it is determined that the type of the folding process is a C fold. When two coordinates are designated as folding-offset and two values are designated as folding-direction in different direction, it is determined that the type of the folding process is a Z fold. When one coordinate is designated as folding-offset, it is determined that the type of the folding process is a half fold. In the case of a half fold, any one of the directions of the value of folding-direction may be designated.

In S1311, the CPU 111 determines whether or not the folding process of the type determined in S1310 can be executed by the sheet processing unit 122. The CPU 111 refers to the type of the folding process that can be executed by the sheet processing unit 122 in the folding process table 403 illustrated in FIG. 4. In this example, a half fold, a C fold, or a Z fold can be executed. When the type of the folding process determined in S1310 is the folding process of the type that can be executed by the sheet processing unit 122, the CPU 111 advances the process to S1312. On the other hand, when the type of the folding process determined in S1310 is not the folding process of the type that can be executed by the sheet processing unit 122, the CPU 111 advances the process to S1314.

In S1312, the CPU 111 determines whether the coordinates (folding-offset) on which the folding process included in the print data is executed match the coordinates based on the ability of the sheet processing unit 122 that are calculated in S904. When the coordinates match, the CPU 111 advances to S1313, and when the coordinates do not match, the CPU 111 advances to S1314.

In S1314, the CPU 111 stores information indicating that the post-processing based on the print data is unexecutable in the RAM 113, and advances the process to S906.

In S1313, the CPU 111 information indicating that the post-processing based on the print data is executable in the RAM 113, and advances the process to S906.

Referring back to the flowchart of FIG. 10, in S906, the CPU 111 determines whether or not the post-processing can be executed based on the result of the comparison performed in S905. When information indicating that the post-processing based on the print data can be executed is stored in the RAM 113, the CPU 111 advances the process to S907. On the other hand, when information indicating that the post-processing based on the print data cannot be executed is stored in the RAM 113, the CPU 111 advances the process to S909.

In S907, the CPU 111 converts the post-processing setting using coordinate designation of the print data into a device internal representation that is acceptable by a device, and advances the process to S908.

In S908, the CPU 111 executes printing based on the print data in cooperation with the printing unit 120. On the sheets printed by the printing unit 120, the post-processing designated in the print data is executed, as needed, according to the designated post-processing setting. When the CPU 111 executes the post-processing, the CPU 111 controls the sheet processing unit 122 to convey to the position where the printed sheets to the folding machine 301, the stapler 307, or the puncher 308 is executed, to thereby execute each post-processing. The sheets on which each post-processing is executed are discharged onto the stack tray 305. When printing is completed, the CPU 111 terminates the series of printing processes.

On the other hand, in S906, the CPU 111 cancels printing based on the print data, and terminates the series of printing processes.

Thus, in this embodiment, even when print data represented using coordinate positions for designation of the post-processing is received, the MFP 101 can compare the coordinate positions with those of the post-processing ability of the MFP 101 and determine whether or not the process is executable. Accordingly, even when print data represented using coordinate positions for designation of the post-processing is received, the MFP 101 can appropriately perform the printing and post-processing based on the print data, as long as the post-processing setting is supported by the MFP 101. Further, printing can be cancelled without executing the printing, upon condition that the print data for which post-processing that is not supported by the MFP 101 is designated is received.

Third Embodiment

The second embodiment illustrates a case where the ability of the sheet processing unit 122 is converted into a representation of post-processing by coordinate designation, and the converted value is compared with a post-processing setting using coordinate designation included in print data to determine whether or not the post-processing can be executed by the sheet processing unit 122.

A third embodiment illustrates a mechanism for allowing an error when a comparison is made, in addition to the second embodiment.

A coordinate position is represented in units of millimeter or the like. Accordingly, it is convenient for a user to determine a comparison method with a certain allowable value. Further, as shown in the ipp-attribute-fidelity attribute and the like of the IPP, when a print property for designating job fidelity is instructed, a large allowable value is not suitable as an allowable value, and the allowable value is preferably set to a minimal value.

The third embodiment illustrates a control process for comparison using an allowable value when the coordinate position of the post-processing ability of the sheet processing unit 122 is compared with the coordinate position of the post-processing set to the print data.

Figure 16:
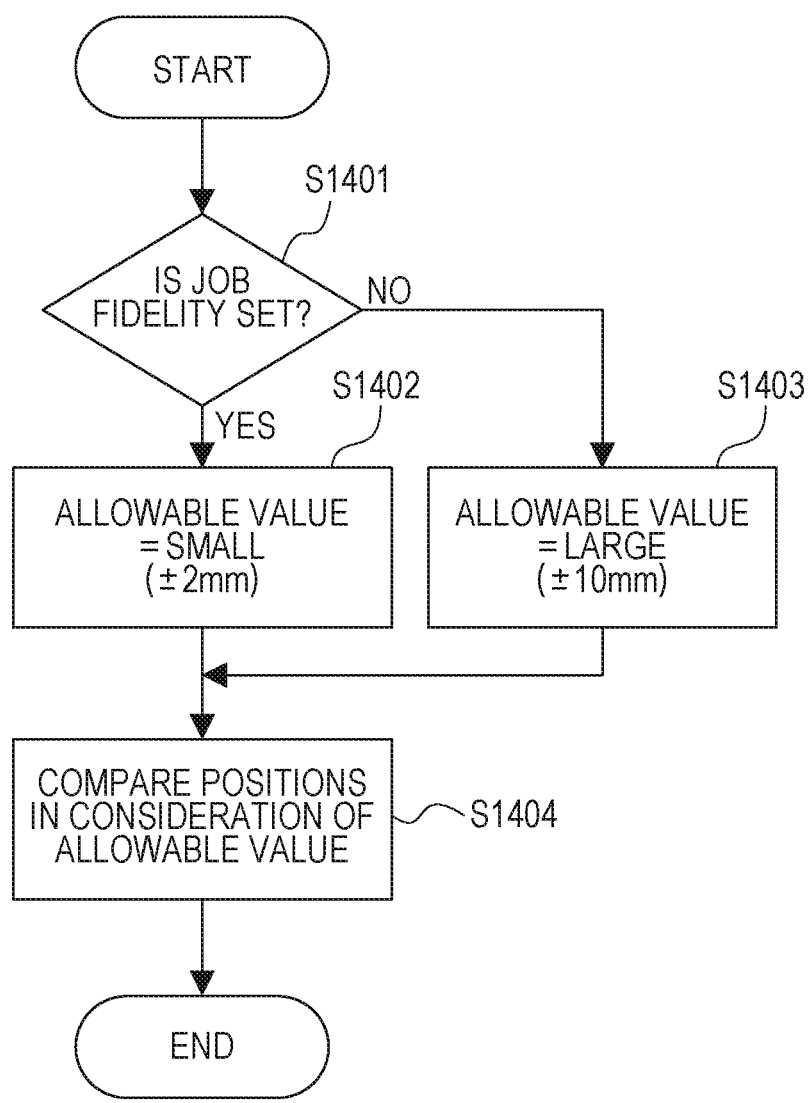
FIG. 16 is a flowchart illustrating an example of control for comparing coordinate positions according to one embodiment.

FIG. 16 is a flowchart illustrating an example of a control process in which the MFP 101 compares coordinate positions. This process is an operation performed in steps (S1304, S1308, S1312) of comparing coordinate positions in FIG. 15 described in the second embodiment.

In S1401, the CPU 111 determines whether or not job fidelity is set to the print data as a result of the analysis in S901. When job fidelity is set to the print data, the CPU 111 advances the process to S1402, and when job fidelity is not set to the print data, the CPU 111 advances the process to S1403.

In S1402, the CPU 111 stores information indicating that a small allowable value (e.g., ±2 mm is set as an allowable value) is used for comparing coordinate positions in the RAM 113, and advances the process to S1404.

On the other hand, in S1403, the CPU 111 stores information indicating that a large allowable value (e.g., ±10 mm is set as an allowable value) is used for comparing coordinate positions in the RAM 113, and advances the process to S1404.

In S1404, the CPU 111 compares coordinate positions using the allowable values stored in the RAM 113. The comparison of coordinate positions will now be described with reference to FIGS. 13 and 17.

Figure 17:
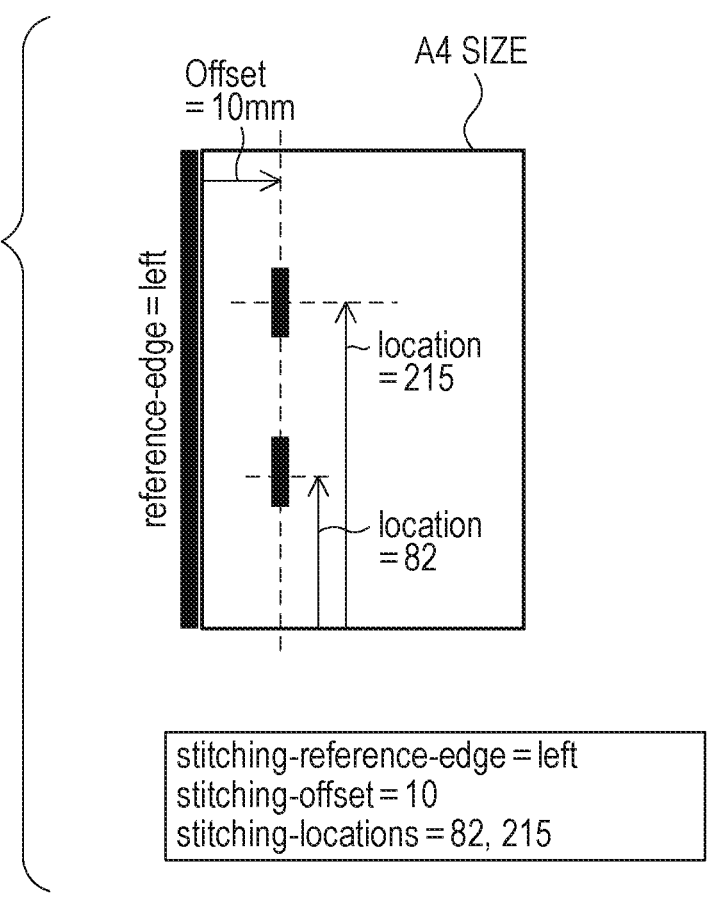
FIG. 17 is a diagram illustrating an example of coordinate position designation of post-processing set to print data according to one embodiment.

FIG. 13 illustrates the coordinate positions of the post-processing ability of the sheet processing unit 122 as described above. FIG. 17 illustrates the coordinate position designation of the post-processing set for the print data.

First, an operation to be performed when job fidelity is set to print data will be described.

The CPU 111 compares the coordinate position (FIG. 13) of the post-processing ability of the sheet processing unit 122 with the coordinate position (FIG. 17) of the post-processing designated in the print data. Since the value of stitching-reference-edge of the post-processing ability and the value of stitching-reference-edge designated in the print data indicate left, the CPU 111 determines that the coordinate positions match. Since the value of stitching-offset of the post-processing ability and the value of stitching-offset designated in the print data indicate 10 mm, the CPU 111 determines that the coordinate positions match. The value of the binding position (top) of stitching-location of the post-processing ability is 208.5 mm, while the value of the binding position (top) of stitching-location designated in the print data is 215 mm. Accordingly, the difference between the values is 6.5 mm. The value of the binding position (bottom) of stitching-location of the post-processing ability is 88.5 mm, while the job setting indicates 82. Accordingly, the difference between the values is 6.5 mm. Since job fidelity is set in this job, the allowable value is ±2 mm, and the calculated difference of 6.5 mm falls outside of the range of the allowable value. Therefore, the CPU 111 determines that the coordinate positions do not match. As a result, it is determined that the post-processing is unexecutable in step S905 described above, and the process is terminated with error in S909.

On the other hand, when job fidelity is not set to the print data, the allowable value is ±10 mm and the calculated difference of 6.5 mm falls within the range of the allowable value. Therefore, it is determined the post-processing is executable in S905, and the printing and the post-processing are executed in S907 and S908.

Thus, according to this embodiment, in the comparison between the coordinate position of the post-processing ability of the sheet processing unit 122 and the coordinate position of the post-processing designated in the print data, the MFP 101 can compare the coordinate positions using an allowable value. This prevents an unnecessary printing error, which occurs when a slight error is included, and improves the convenience for the user. Furthermore, the allowable value can be changed to a small allowable value by setting job fidelity to the print data, upon condition that setting a large allowable value is undesirable.

Figure 18:
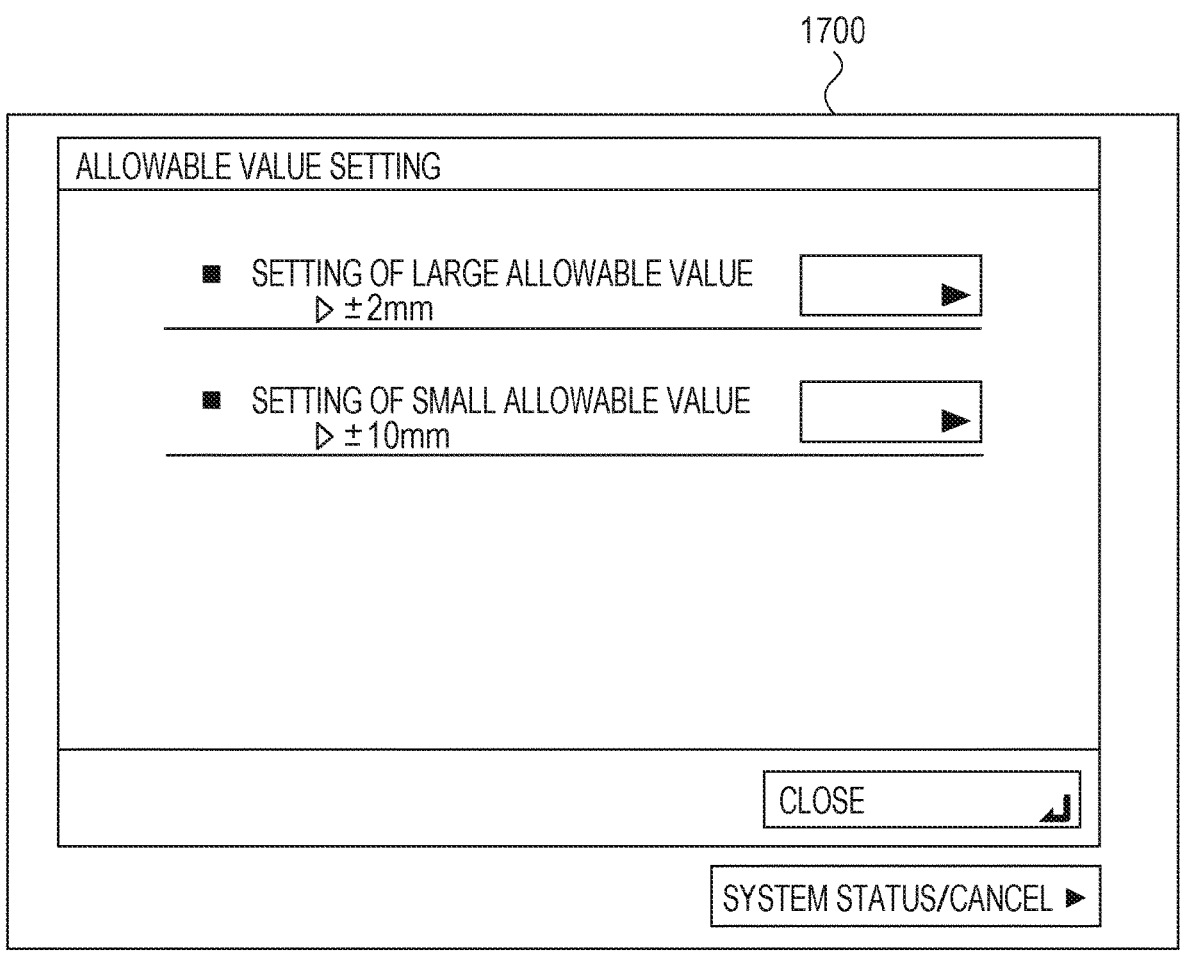
FIG. 18 is a diagram illustrating an example of an allowable value setting screen according to one embodiment.

Specific values (±2 mm etc.) for these allowable values may be accepted by the CPU 111 from the user (or administrator) through the operation unit 116 or the like, and the setting in the print apparatus may be changed based on the accepted result. For example, FIG. 18 illustrates an example of a screen for accepting an allowable value from the user. An allowable value setting screen 1700 is a screen displayed on the operation unit 116 of the MFP 101. Values including an allowable value (large) and an allowable value (small) can be set through a user's operation on the screen. The allowable value set in this case is stored in the RAM 113, and the stored allowable value can be read out any time by the CPU 111. The CPU 111 reads out the value that is set on the allowable value setting screen 1700 and stored in the RAM 113, upon condition that the processes of S1402 and S1403 described above are performed, and the position comparison is performed in S1404.

Thus, since the allowable values used for comparison of coordinate positions can be changed by the user, an appropriate setting can be provided depending on the user environment.

While the embodiments of the present disclosure have been described in detail above, the present disclosure is not limited to the specific embodiments. For example, the above embodiments illustrate the printing protocol using the IPP (Internet Printing Protocol) defined in the PWG (Printer Working Group). However, the printing protocol is not limited to the IPP.

As described above, the information processing according to the embodiments described above makes it possible for even the print apparatus in which the positions for executable post-processes are limited to perform appropriate processes based on the received print data.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-181869, filed Sep. 16, 2016, which is hereby incorporated by reference herein in its entirety.

What is claimed is:

1. A print apparatus comprising:
    a printing device;
    a post-processing device configured to perform a post-processing at at least one of a plurality of positions of a sheet, the plurality of positions being positions at which the post-processing device is able to perform post-processing;
    at least one processor; and
    at least one memory storing instructions which, when executed by the at least one processor, cause the print apparatus to perform operations of:
    a first reception unit configured to receive an inquiry from a print service of an external device;
    a first determination unit configured to determine whether the print service that sent the inquiry needs coordinate information of the plurality of positions that the post-processing device is able to perform the post-processing at; and
    an ability response unit configured to transmit ability information to the external device as a response to the received inquiry,
    wherein if it is determined that the coordinate information of the plurality of positions is needed, the transmitted ability information includes null instead of the coordinate information of the positions at which the post-processing device is able to perform the post-processing, and
    if it is determined that the coordinate information of the plurality of positions is not needed, the transmitted ability information includes neither the coordinate information of the positions, nor the null instead of the coordinate information of the position.

2. The print apparatus according to claim 1, wherein in a case where it is determined that the print service that sent the inquiry needs the coordinate information of the plurality of positions, the ability information transmitted to the external device includes information indicating that position designation of the post-processing is unsupported, and
    in a case where it is determined that the print service that sent the inquiry does not need the coordinate information of the plurality of positions, the ability information transmitted to the external device includes no information indicating whether the position designation of the post-processing is supported.

3. The print apparatus according to claim 2, wherein when the at least one processor executes the instructions, the print apparatus further performs operations of a third determination unit configured to determine, based on the information about a transmitter included in a printer search packet received from the external device, whether the external device requests support for the position designation of the post-processing.

4. The print apparatus according to claim 1, wherein when the at least one processor executes the instructions, the print apparatus further performs operations of
    a second determination unit configured to determine whether or not setting of position designation of the post-processing in the received job is performed by coordinate designation with an edge of a sheet to be printed as an origin point.

5. The print apparatus according to claim 1, wherein the post-processing device is a sheet processing unit configured to perform hg post-processing on a printed sheet.

6. The print apparatus according to claim 5, wherein the post-processing includes at least one of a binding process, punching, or a folding process.

7. A control method for controlling a print apparatus including a printing device and a post-processing device, the post-processing device configured to perform a post-processing at at least one of a plurality of positions of a sheet, the plurality of positions being positions at which the post-processing device is able to perform post-processing, the control method comprising:
    receiving an inquiry from a print service of an external device;
    determining whether the print service that sent the inquiry needs coordinate information of the plurality of positions that the post-processing device is able to perform the post-processing at; and
    transmitting ability information, to the external device, as a response to the received inquiry,
    wherein if it is determined that the coordinate information of the plurality of positions is needed, the transmitted ability information includes null instead of the coordinate information to the position at which the post-processing device is able to perform the post-processing, and
    if it is determined that the coordinate information of the plurality of positions is not needed, the transmitted ability information includes neither the coordinate information of the positions, nor the null instead of the coordinate information of the positions.

8. A non-transitory computer-readable storage medium storing instructions for causing a computer to execute a control process for a print apparatus including a printing device and a post-processing device, the post-processing device configured to perform a post-processing at at least one of a plurality of positions of a sheet, the plurality of positions being positions at which the post-processing device is able to perform post-processing, the process comprising:
    receiving an inquiry from a print service of an external device;
    determining whether the print service that sent the inquiry needs coordinate information of the plurality of positions that the post-processing device is able to perform the post-processing at; and
    transmitting ability information, to the external device, as a response to the received inquiry,
    wherein if it is determined that the coordinate information of the plurality of positions is needed, the transmitted ability information includes null instead of the coordinate information of the position at which the post-processing device is able to perform the post-processing, and
    if it is determined that the coordinate information of the plurality of positions is not needed, the transmitted ability information includes neither the coordinate information of the positions, nor the null instead of the coordinate.

9. The print apparatus according to claim 1, wherein the post-processing is a method defined in IPP Finishing 2.0.

* * * * *